(12) United States Patent
Molek

(10) Patent No.: US 6,431,501 B1
(45) Date of Patent: Aug. 13, 2002

(54) INTERLOCKING MODULAR LADDER-TYPE CABLE TRAY

(76) Inventor: Efraim Molek, 24 Malchei Yehuda Street, Herzliya 46348 (IL)

( * ) Notice: Subject to any disclaimer, the term of this patent is extended or adjusted under 35 U.S.C. 154(b) by 0 days.

(21) Appl. No.: 09/647,950

(22) PCT Filed: Feb. 4, 1999

(86) PCT No.: PCT/IL99/00073

§ 371 (c)(1), (2), (4) Date: Dec. 14, 2000

(87) PCT Pub. No.: WO99/53584

PCT Pub. Date: Oct. 21, 1999

(30) Foreign Application Priority Data

Apr. 8, 1998 (IL) .................................................. 124018

(51) Int. Cl.⁷ .................................................. F16L 3/22
(52) U.S. Cl. ........................... 248/68.1; 248/49; 248/58
(58) Field of Search ........................... 248/49, 58, 68.1, 248/72; 174/68.1; 403/230, 257, 263, 319

(56) References Cited

U.S. PATENT DOCUMENTS

| | | | |
|---|---|---|---|
| 3,722,933 A | 3/1973 | Nute, Jr. | ................. 287/189.36 |
| 3,791,613 A | 2/1974 | Nollen | ......................... 248/49 |
| 3,915,420 A | 10/1975 | Norris | .......................... 248/58 |
| 4,080,742 A | 3/1978 | Osterried | ...................... 33/177 |
| 5,465,929 A | 11/1995 | Dooley | ........................ 248/681 |

FOREIGN PATENT DOCUMENTS

| | | |
|---|---|---|
| EP | 0 119 670 | 9/1984 |
| GB | 2 130 023 | 5/1984 |

*Primary Examiner*—Kimberly T. Wood
*Assistant Examiner*—Gwendolyn Baxter

(57) ABSTRACT

A ladder-type cable tray (10) for cables or the like, the ladder including one or more pairs of L-shaped side rail members (11) having vertical and horizontal sides, the vertical side (12) having formed therein a protruding spring tab (14) disposed above a socket (16); and one or more U-shaped rung members (22) formed at either end with a flange (23) enclosing a U-shaped opening and defining a folded edge terminating in at least one tooth (24), the folded edge having formed therein a slot (26) for engaging the spring tab (14), such that upon insertion of the rung member (22) tooth into the socket on the side-rail (11), the spring tab (14) is deflected laterally and returns to its position to engage the locking slot (26) in the rung (22) and lock the rung to the side-rail (11), the locked rung (22) forming a support platform for the cable in a rigid fashion.

8 Claims, 6 Drawing Sheets

INTERLOCKING MODULAR LADDER-TYPE CABLE TRAY

FIELD OF THE INVENTION

The present invention relates to cable trays and in particular to ladder-type cable trays with interlocking design of modular units for many cabling applications.

BACKGROUND OF THE INVENTION

Cable ladders are commonly used in many wire and cabling applications, for example, in power distribution systems, communications centers, data processing and industrial installations to support the extensive cabling systems necessary in these applications. Ladder-type construction is open to all sides and allows easy access to cables which frequently have to be checked or rerouted.

Current cable ladders are constructed of heavy steel bolted or fastened together into extended runs. Components are often large and bulky. Construction of the system or chances in the construction requires considerable effort to use fasteners to connect each rung to the side-rails.

U.S. Pat. No. 5,465,929 to Dooley and U.S. Pat. No. 5,580,014 to Rinderer both disclose ladder-type cable tray systems which require fasteners. U.S. Pat. No. 4,319,724 to Bradbury discloses a ladder-type cable tray with rungs which are disposed in slots on the side-rails for a friction fit In this construction, the rungs must be placed in the side-rails during assembly and may not be removed from the side-rail without dissassembling the side-rail, which requires detaching it from the support surface This makes modification difficult In addition, the design of the Bradbury patent requires the user to cut side-rails and rungs to the desired length and does not provide a modular construction adaptable to different uses.

Thus it would be desirable to provide a ladder-type cable tray which would be lightweight, simple to construct, without requiring fasteners, and easy to transport and store.

SUMMARY OF THE INVENTION

Accordingly, it is a principal object of the present invention to overcome disadvantages associated with prior art and provide an interlocking, modular ladder-type cable tray which is quickly assembled and simple to install and uninstall and does not require fasteners for the rungs. Its modular construction allows for the use of smaller components, offering the advantages of ease in transport and storage, and the ability to make changes in layout as necessary.

In accordance with a preferred embodiment of the present invention, there is thus provided a ladder-type cable tray for cables or the like, the ladder including:
- one or more pairs of L-shaped side-rail members having vertical and horizontal sides, the vertical side having formed therein a protruding spring tab disposed above a socket;
- one or more U-shaped rung members formed at either end with a flange enclosing a U-shaped opening and defining a folded edge terminating in at least one tooth, the folded edge having formed therein a slot for engaging the spring tab;
- such that upon insertion of the rung member tooth into the socket on the side-rail, the spring tab is deflected laterally and returns to its position to engage the locking slot in the rung and lock the rung to the side-rail, the locked rung forming a support platform for the cables in a rigid fashion.

In a preferred embodiment of the invention, a ladder-type cable tray is provided including two generally parallel L-shaped side-rails interlocked with one or more crosspieces forming a ladder rung. The rungs interlock in a non-rotational manner so as to provide stability to the ladder.

The side-rail is formed with a spring tab, a C-shaped socket and two or more apertures. The rung is provided on each end with a locking slot for engaging the spring tab, and is provided with two or more teeth, two or more pins and a notch. The ladder-type cable tray is assembled by inserting the teeth of the rung into the C-shaped sockets on a pair of oppositely-facing side-rails and depressing the rung, so that the spring tab is deflected laterally and returns to its position, becoming engaged in the locking slot formed in the rung. The teeth prevent rotation and slippage of the rung. As the rung is depressed the pins on the rung are inserted into the apertures formed on the side-rail. When the rung abuts the side-rail, a notch formed on the outer edge of the rung allows the pins to be fully inserted into the apertures formed on the side-rail, so that the rung becomes seated securely on the side-rail as the notch edge abuts the side-rail edge. In this interlocked engagement, the insertion of the teeth in the C-shaped socket and the insertion of the pins in the apertures cause the notch edge to abut the side-rail edge and form a rigid construction which prevents relative rotation or movement between the rung and the side-rail.

The ladder can be mounted in a vertical or horizontal fashion, and in areas with limited accessibility. Side-rails can be constructed with bends of any angle for construction of systems which bend and turn. Rungs can be mounted in any order along the side-rails during assembly and installation. For disassembly purposes, the spring tab is depressed so as to disengage the spring tab from the locking slot enabling clearance for removal of the rung from its position in the ladder-type cable tray. The lack of tools needed to do this and the ease with which disassembly can be accomplished allows the user the ability to make adjustments to the cable tray as needed with a minimum of effort One or more of the side-rails is attached to a wall by means of mounting holes provided on the side-rail Additional mounting holes may be provided for optional mounting alternatives.

In a preferred embodiment, the side-rails are mounted in a staggered fashion such that the junctions between the side-rails are not opposite one another. This provides greater strength to the cable tray construction.

Other features and advantages of the invention will become apparent from the following drawings and description.

BRIEF DESCRIPTION OF THE DRAWINGS

For a better understanding of the invention, with regard to the embodiments thereof, reference is made to the accompanying drawings, in which like numerals designate corresponding or sections throughout, and in which.

DETAILED DESCRIPTION OF A PREFERRED EMBODIMENT

Figure 1:
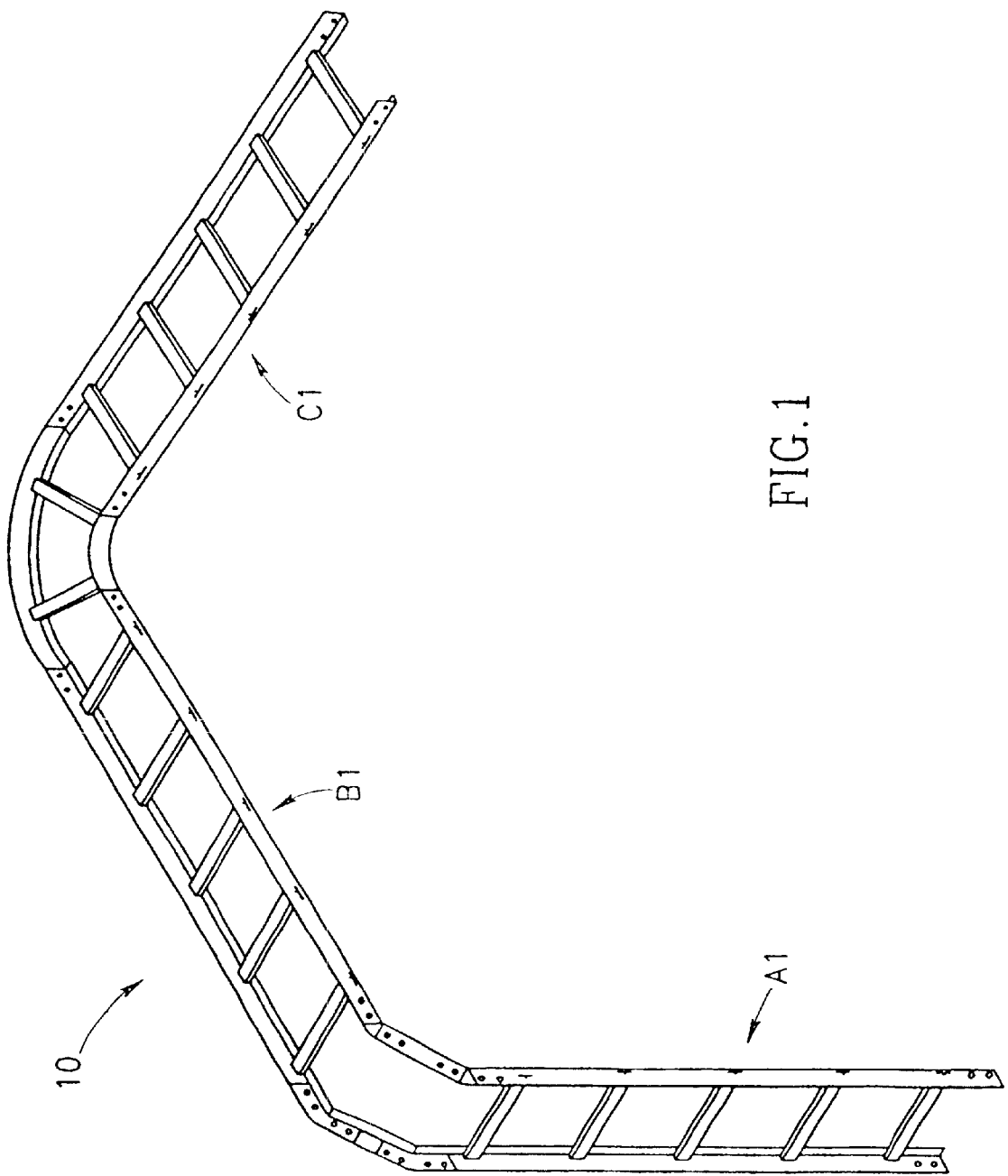
FIG. 1 shows an overview of an interlocking modular ladder-type cable tray constructed in accordance with the principles of the present invention.

Referring now to FIG. 1, there is shown an overview of an interlocking modular ladder-type cable tray 10 with sections A1, B1, and C1, each having a different orientation, showing the layout flexibility of the inventive cable tray. Vertical section A1 rises vertically and is connected to horizontal section B1. Horizontal section B1 is connected to horizontal section C1 via a curved section, for orientation at a 90° angle.

Figure 2:
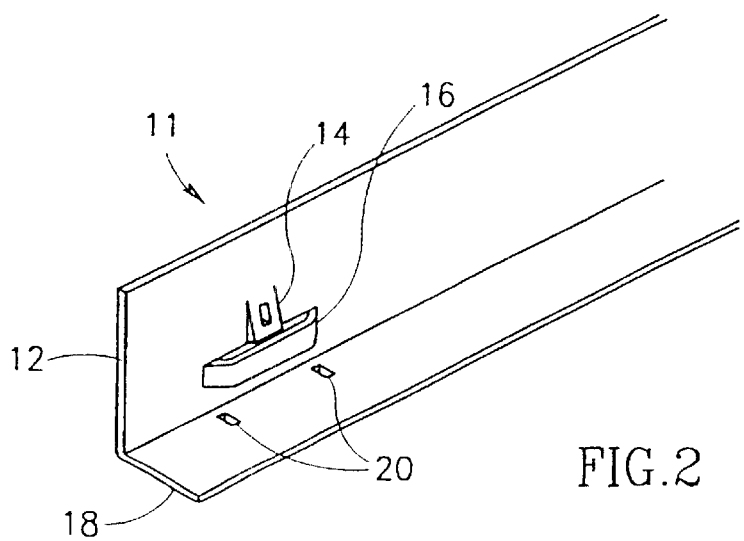
FIG. 2 is a perspective view of one end of a side-rail of the cable tray of FIG. 1.

In FIG. 2 there is shown a perspective view of one end of side-rail 11 which is provided as an L-shaped beam with vertical and horizontal sides. Vertical side 12 is formed with spring tab 14 and C-shaped socket 16. Horizontal side 18 is formed with at least two apertures 20.

Figure 3A:
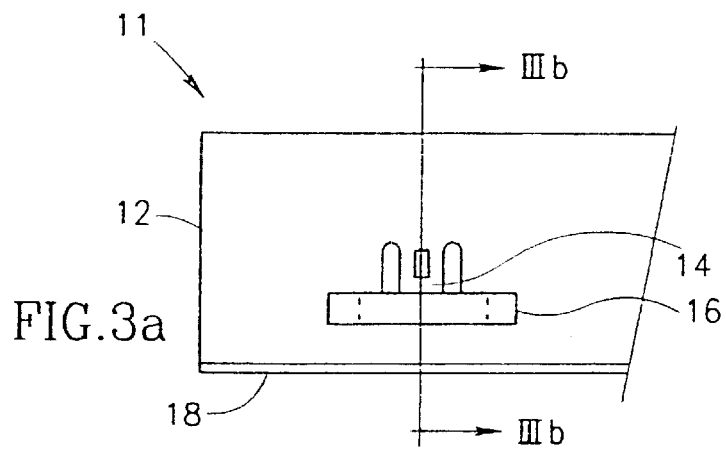
FIGS. 3a–c show, respectively, front, side cross-sectional and top views of one end of a side-rail.
Figure 3B:
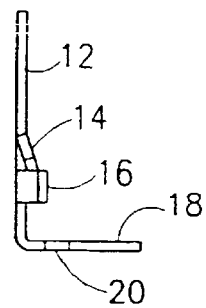
Figure 3C:
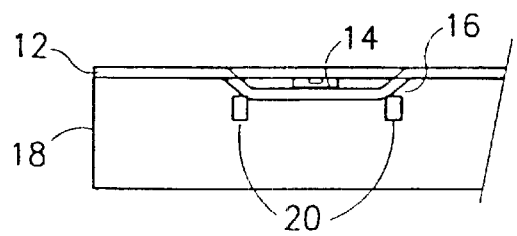

In FIG. 3a there is shown a front view of side-rail 11, showing spring tab 14 and C-shaped socket 16 provided on vertical side 12. FIG. 3b shows a cross-section of side-rail 11 along section lines IIIb—IIIb of FIG. 3a, showing spring tab 14 and C-shaped socket 16 on vertical side 12, and aperture 20 on horizontal side 18. In FIG. 3c a top view of side-rail 11 is shown, featuring spring tab 14, C-shaped socket 16 and apertures 20.

Figure 4:
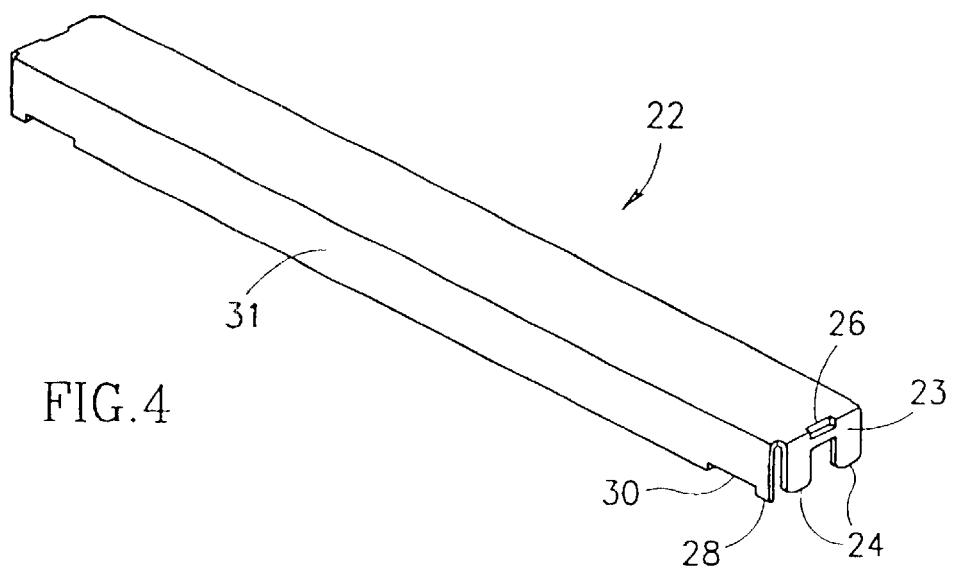
FIG. 4 is a prespective view of a rung of the cable tray of FIG. 1.

In FIG. 4, there is shown a perspective view of rung 22. Rung 22 is provided as a U-shaped section with flange 23 folded over at its ends defining folded edges, having formed therein at least two teeth 24 and a locking slot 26. At least two pins 28 and notch 30 are provided on each of side surfaces 31 of rung 22 proximate its ends.

Figure 5A:
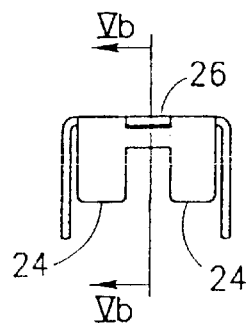
FIGS. 5a–c show, respectively, end, side cross-sectional and top views of one end of a rung.
Figure 5B:
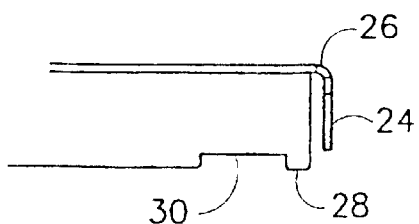
Figure 5C:
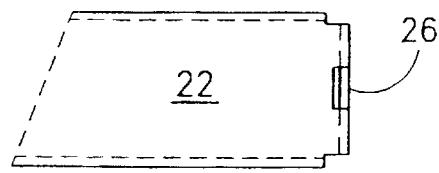

Referring now to FIG. 5a, there is shown an end view of rung 22, formed with teeth 24 and locking slot 26. FIG. 5b shows a cross-sectional side view along section lines Vb—Vb, of FIG. 5a. The layout of tooth 24, locking slot 26, pin 28 and notch 30 are shown. FIG. 5c is a top view of rung 22 formed with locking slot 26.

Figure 6A:
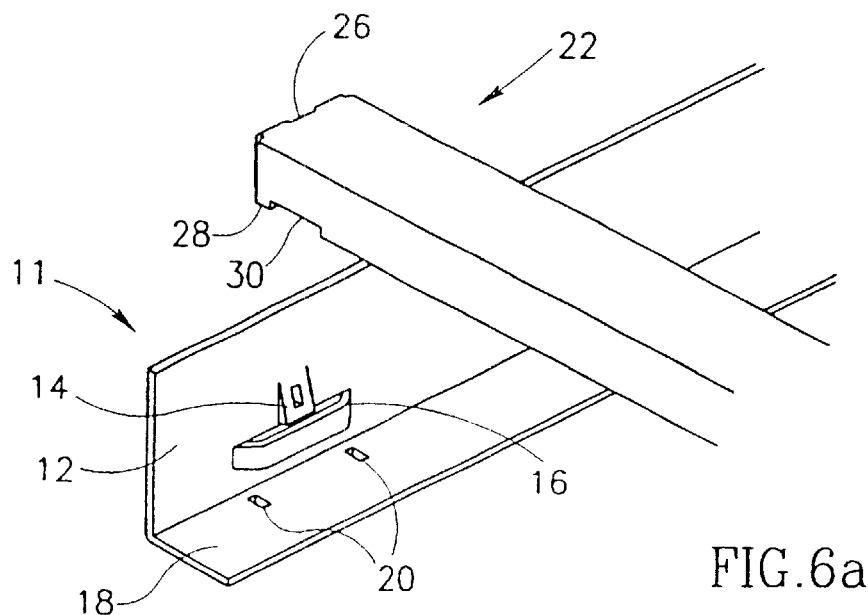
FIGS. 6a and 6b are perspective views illustrating the insertion of one end of a rung into a side-rail.
Figure 6B:
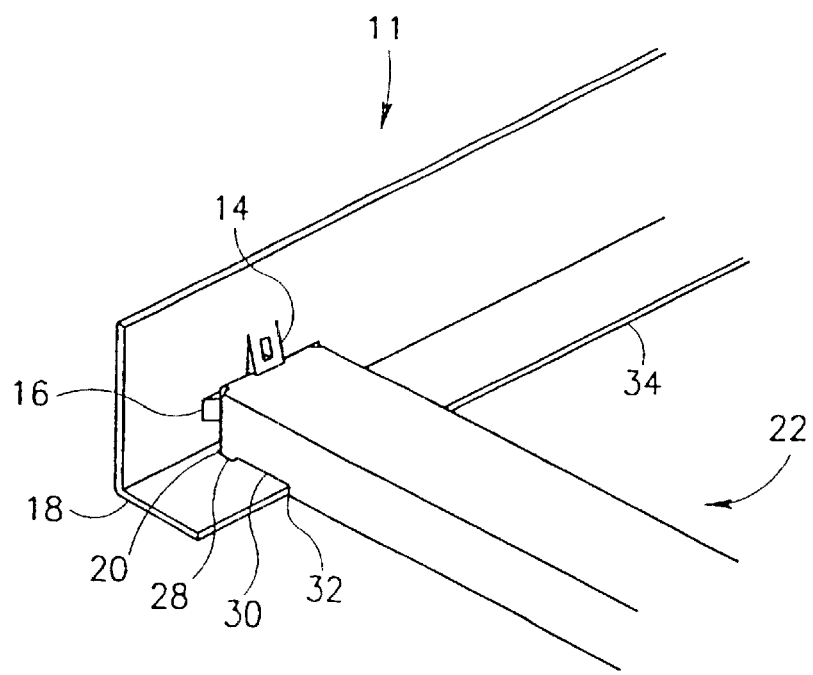
Figure 7A:
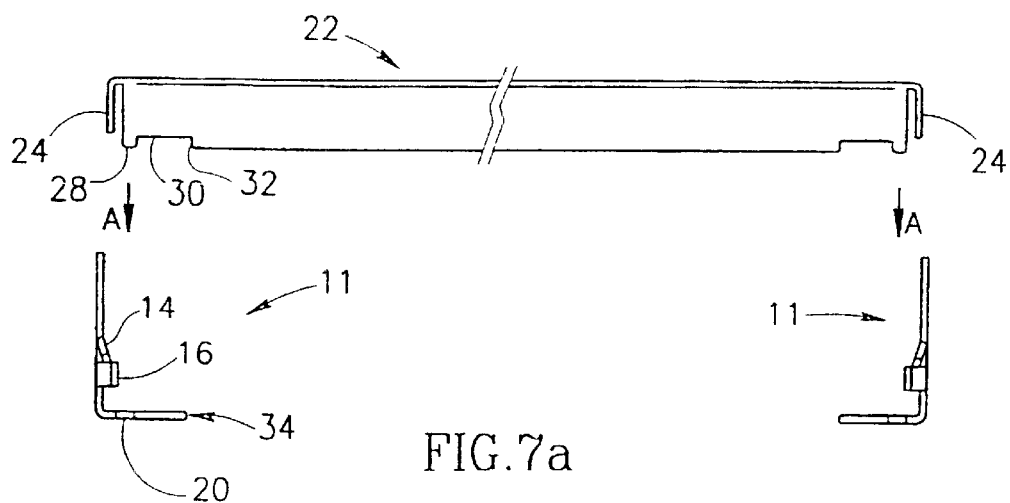
FIGS. 7a and 7b illustrate the insertion of a rung between two side-rails.
Figure 7B:
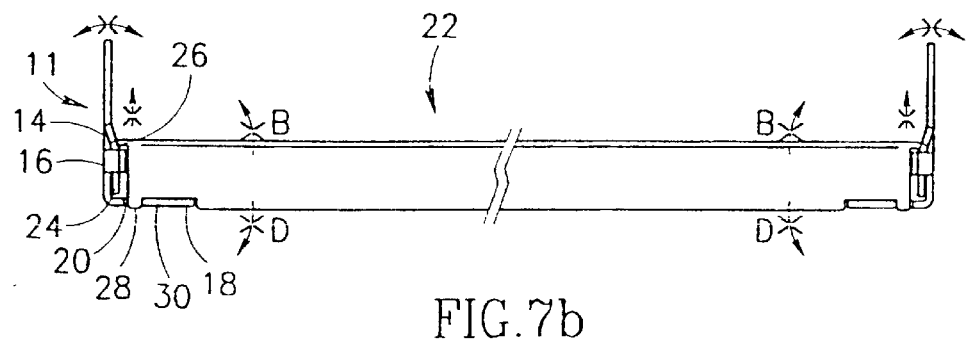

FIGS. 6a–b show a perspective view illustrating the insertion of rung 22 into side-rail 11 as a part of the inventive assembly method, as will be further described in FIGS. 7a–b. After rung 22 has been inserted, FIG. 6b shows the resulting arrangement in which spring tab 14 is inserted into locking slot 26, teeth 24 are inserted in C-shaped socket 16, pins 28 are inserted in apertures 20, and notch 30 is fitted onto horizontal side 18 such that notch edge 32 abuts side-rail edge 34.

FIGS. 7a–b show the assembly method in greater detail. In FIG. 7a, the direction of insertion of rung 22 into side-rail 11 is indicated by arrows A. Upon assembly of the cable tray, teeth 24 on rung 22 are inserted into C-shaped socket 16 on side-rail 11, causing spring tab 14 to be deflected laterally. Preferably, spring tab 14 is formed so as to be sufficiently resilient such that it returns to its initial alignment once rung 22 has been fully inserted in portion, so as to become inserted in locking slot 26 in rung 22, thereby locking the rung 22 with respect to side-rail 11. Alternatively, however, spring tab 14 may be of reduced resilience, such that it may have to be bent into locking engagement with locking slot 26, such as by use of a screwdriver or the like.

Pins 28 on rung 22 are inserted into apertures 20 on side-rail 11. Notch 30 on rung 22 allows pins 28 to be fully inserted into apertures 20 on side-rail 11. In this interlocked engagement, the insertion of teeth 24 in C-shaped socket 16 and the insertion of pins 28 in apertures 20 cause notch edge 32 to abut side-rail edge 34 and form a rigid construction which prevents relative rotation or movement between the rung and the side-rail.

To disassemble the cable tray, spring tab 14 is depressed, in some cases, by conveniently inserting a screwdriver, so as to disengage spring tab 14 from locking slot 26, enabling clearance for removal of rung 22 from its position between side-rails 11.

Figure 7C:
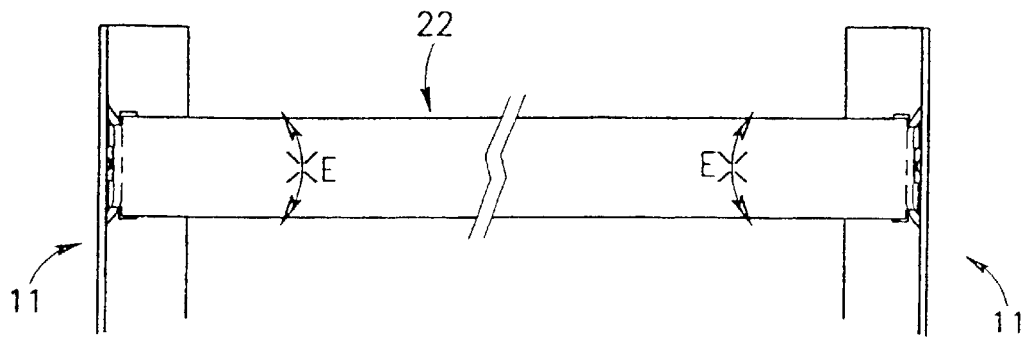
FIG. 7c shows a top view of a rung inserted between two side-rails.

Once assembled, FIG. 7b shows a cross-sectional view of rung 22 inserted between two side-rails 11, in which spring tab 14 is inserted into locking slot 26, teeth 24 are inserted in C-shaped socket 16, pins 28 are inserted in apertures 20, and notch 30 is fitted onto horizontal side 18. Arrows B and D are marked to indicate that motion in the indicated directions is prevented by the insertion of rung 22 into side-rails 11. FIG. 7c shows a top view of rung 22 inserted between two side-rails 11 such that motion in the direction of arrows E is not possible.

Figure 8:
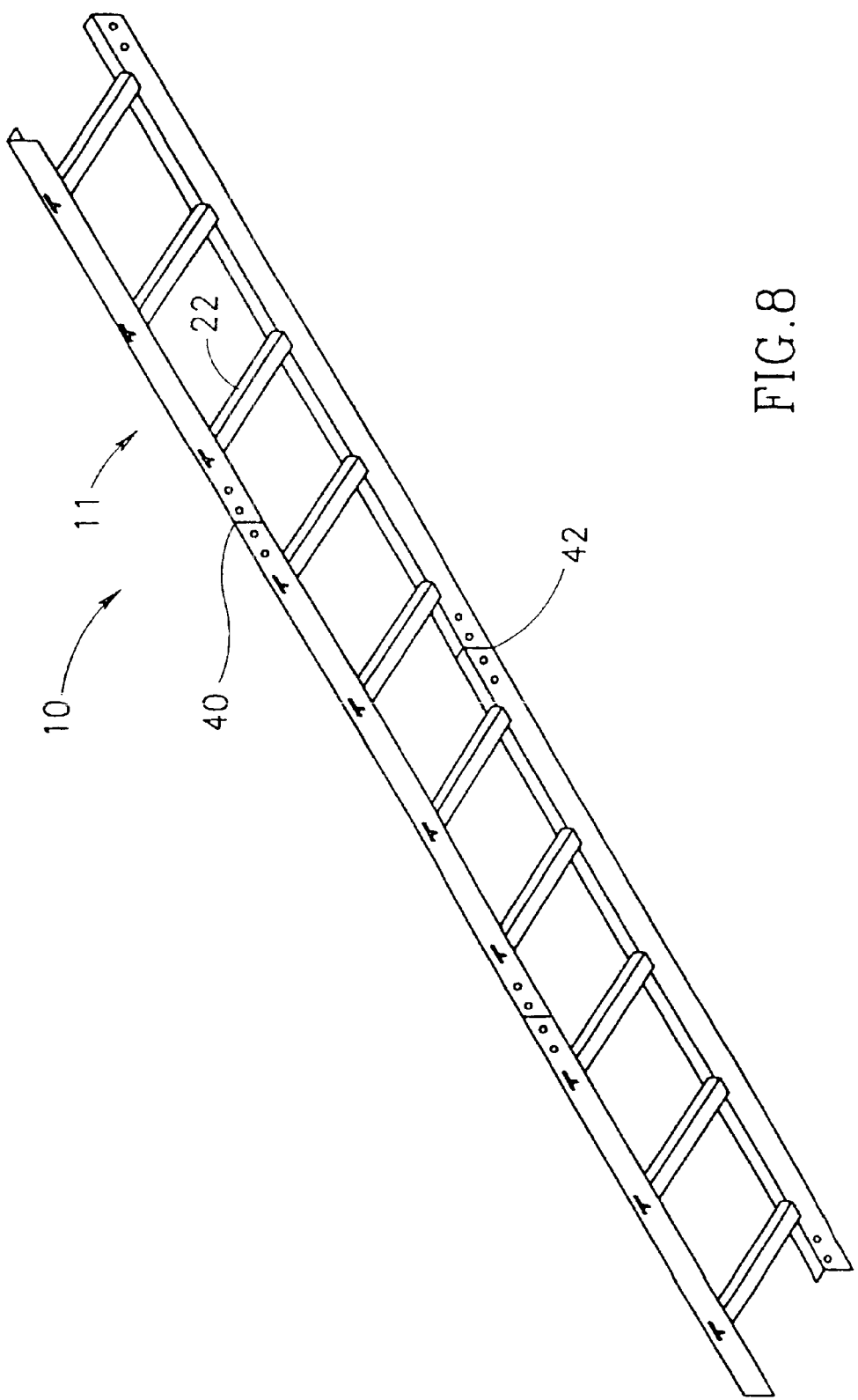
FIG. 8 illustrates an interlocking modular ladder-type cable tray constructed with a staggered layout of the side-rails

In FIG. 8, a preferred embodiment of the cable tray is shown, such that junctures 40 and 42 between adjacent side-rails are not opposite to each other. This construction features staggered assembly of side-rails 11 providing greater strength.

Having described the invention with regard to specific embodiments thereof it is to be understood that the description is not meant as a limitation, since further modifications may now suggest themselves to those skilled in the art, and it is intended to cover such modifications as fall within the scope of the appended claims.

What is claimed is:

1. A ladder-type cable tray for cable-like elements, said cable tray including:

at least a pair of L-shaped side-rail members having vertical and horizontal sides, said vertical side having formed therein a protruding spring tab disposed above a socket;

at least one U-shaped rung member formed at each end with a flange enclosing a U-shaped opening and defining a folded edge terminating in at least one tooth, said folded edge having formed therein a slot for engaging said spring tab;

such that upon insertion of said rung member tooth into said socket on said side-rail member, said spring tab is deflected and returns to a position to engage said slot in said rung member and lock said rung member to said side-rail member, said locked rung member forming a support platform for said cable-like elements in a rigid fashion.

2. The ladder-type cable tray of claim 1, wherein:

said horizontal side of each side-rail member is formed with at least one aperture; and said rung member is formed with at least one pin and a notch at an end thereof;

such that upon insertion of said rung pin into said side-rail member, an edge of said rung notch abuts said edge of said side-rail member, becoming seated securely on said side-rail member, said locked rung member forming a stable non-rotatable support platform.

3. The ladder-type cable tray of claim 1, wherein said side-rail members form at least two substantially parallel runs of said side-rail members with adjacent side-rail members abutting one another at a junction, said runs being positioned such that the junction of the ends of said side-rail members on a first run is not opposite the junction of the ends of said side-rail members on a second run, such that said side-rail members are positioned in a staggered fashion so as to provide the ladder-type cable tray with added stability and strength.

4. The ladder-type cable tray of claim 1, wherein sections thereof are oriented in at least one of vertical and horizontal orientations or at an angle therebetween.

5. The ladder-type cable tray of claim 1, wherein said at least one rung member and said side-rail members are provided as interlocking modular units.

6. A method for assembling a ladder-type cable tray for cable-like elements, said method comprising:

providing at least a pair of L-shaped side-rail members having vertical and horizontal sides, said vertical side having formed therein a protruding spring tab disposed above a socket;

providing at least one U-shaped rung member formed at either end with a flange enclosing a U-shaped opening and defining a folded edge terminating in at least one tooth, said folded edge having formed therein a slot for engaging said spring tab; and inserting said rung member tooth into said socket on said side-rail member, such that said spring tab is deflected and returns to a position to engage said slot in said rung member and lock said rung member to said side-rail member, said locked rung member forming a support platform for said cable-like elements in a rigid fashion.

7. The method for assembling the ladder-type cable tray for cable-like elements according to claim 6, further comprising:

inserting a pin formed in an end of said rung member into an aperture formed in said horizontal side of said side-rail member such that a notch on an end of said rung member abuts an edge of said side-rail member, locking said rung member therein, forming a stable non-rotatable support platform.

8. The method for assembling the ladder-type cable tray for cable-like elements according to claim 6, further comprising:

positioning said side-rail members adjacent to one another to form at least two substantially parallel runs of said side-rail members with adjacent side-rail members abutting one another at a junction, said runs being positioned such that the junction of the ends of said side-rail members on a first one of the runs is not opposite the junction of the ends of said side-rail members on a second one of the runs, such that said side-rail members are positioned in a staggered fashion so as to provide the ladder-type cable tray with added stability and strength.

* * * * *